(12) United States Patent
Noguchi et al.

(10) Patent No.: US 11,400,921 B2
(45) Date of Patent: Aug. 2, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Chie Sugihara, Tokyo (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 16/822,084

(22) Filed: Mar. 18, 2020

(65) Prior Publication Data

US 2020/0307556 A1     Oct. 1, 2020

(30) Foreign Application Priority Data

Mar. 28, 2019  (JP) .............................. JP2019-064036

(51) Int. Cl.
 *B60W 30/06* (2006.01)
 *B60W 10/20* (2006.01)
 (Continued)

(52) U.S. Cl.
 CPC ............ *B60W 30/06* (2013.01); *B60W 10/20* (2013.01); *B60W 60/0025* (2020.02); *G05D 1/0223* (2013.01); *B60W 2530/00* (2013.01); *B60W 2540/00* (2013.01); *B60W 2720/10* (2013.01); *B60W 2756/10* (2020.02)

(58) Field of Classification Search
 CPC .. B60W 30/06; B60W 10/20; B60W 60/0025; B60W 2530/00; B60W 2756/10; B60W 2540/00; B60W 2720/10; G05D 1/0223
 See application file for complete search history.

(56) References Cited

U.S. PATENT DOCUMENTS

2019/0111916 A1 *  4/2019  Lee ...................... G05D 1/0088
2020/0198620 A1 *  6/2020  Nakata .................... G06F 21/32

FOREIGN PATENT DOCUMENTS

JP     2011-141854       7/2011
JP   WO2015/166721     11/2015
(Continued)

OTHER PUBLICATIONS

Japanese Office Action for Japanese Patent Application No. 2019-064036 dated May 17, 2022.

*Primary Examiner* — Russell Frejd
*Assistant Examiner* — Ana D Thomas
(74) *Attorney, Agent, or Firm* — Amin, Turocy & Watson, LLP

(57) ABSTRACT

According to an embodiment, a vehicle control device includes a recognizer configured to recognize a surrounding environment of a vehicle and recognize a locking state of the vehicle and a driving controller configured to perform driving control of one or both of a speed and steering of the vehicle on the basis of a recognition result of the recognizer. The driving controller causes the vehicle to depart when a door of the vehicle is locked after an occupant of the vehicle gets out of the vehicle in a predetermined area in a state in which predetermined conditions are satisfied.

12 Claims, 11 Drawing Sheets

(51) Int. Cl.
G05D 1/02 (2020.01)
B60W 60/00 (2020.01)

(56) References Cited

FOREIGN PATENT DOCUMENTS

| | | |
|---|---|---|
| JP | 2018-101226 | 6/2018 |
| JP | 2018-197444 | 12/2018 |
| JP | 2019-026067 | 2/2019 |
| JP | 2020-109668 | 7/2020 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-064036, filed Mar. 28, 2019, the content of which is incorporated herein by reference.

BACKGROUND

Field of the Invention

The present invention relates to a vehicle control device, a vehicle control method, and a storage medium.

Description of Related Art

In recent years, research has been conducted on automatedly controlling vehicles. In relation to this research, technology for causing a vehicle to be parked in a parking space if a remote lock operation command for remotely commanding a lock operation is transmitted to the vehicle when the vehicle which enters the parking space is located in a getting-out space and a driver gets out of the vehicle is known (for example, Japanese Unexamined Patent Application, First Publication No. 2018-197444).

SUMMARY

However, in the conventional technology, it may not be possible to determine whether the remote lock operation command is a mere door lock operation or a lock operation also serving as a parking instruction. Thus, appropriate driving control may be unable to be performed.

Aspects of the present invention have been made in view of such circumstances and an objective of the present invention is to provide a vehicle control device, a vehicle control method, and a storage medium capable of executing more appropriate driving control.

A vehicle control device, a vehicle control method, and a storage medium according to the present invention adopt the following configurations.

(1): According to an aspect of the present invention, there is provided a vehicle control device including: a recognizer configured to recognize a surrounding environment of a vehicle and recognize a locking state of the vehicle; and a driving controller configured to perform driving control of one or both of a speed and steering of the vehicle on the basis of a recognition result of the recognizer, wherein the driving controller causes the vehicle to depart when a door of the vehicle is locked after an occupant of the vehicle gets out of the vehicle in a predetermined area in a state in which predetermined conditions are satisfied.

(2) In the above-described aspect (1), the vehicle control device further includes an acceptor configured to accept an operation of the occupant, wherein the driving controller causes the vehicle to be parked in a parking area when the acceptor accepts a setting of a mode in which the vehicle is parked in a predetermined parking area before the occupant gets out of the vehicle, the occupant of the vehicle gets out of the vehicle in the predetermined area, and the door of the vehicle is locked.

(3): In the above-described aspect (2), the driving controller does not execute driving control for causing the vehicle to be parked in the parking area when the occupant of the vehicle gets out of the vehicle in the predetermined area and the door of the vehicle is locked in a state in which the acceptor does not accept the setting of the mode before the occupant gets out of the vehicle.

(4): In the above-described aspect (1), the driving controller causes the vehicle to depart when the recognizer recognizes that the vehicle has entered an area where the vehicle is allowed to travel according to the driving control and when the occupant of the vehicle gets out of the vehicle in the predetermined area and the door of the vehicle is locked.

(5): In the above-described aspect (2), the vehicle control device further includes a communicator configured to communicate with a terminal device of the occupant, wherein the predetermined area includes a first area and a second area, and wherein the driving controller makes a condition for causing the vehicle to depart different between a case in which the occupant is allowed to get out of the vehicle in the first area and a case in which the occupant is allowed to get out of the vehicle in the second area.

(6): In the above-described aspect (5), the driving controller causes the vehicle to depart when the occupant gets out of the vehicle in the first area and the door of the vehicle is locked, and the driving controller causes the vehicle to depart when the occupant gets out of the vehicle in the second area, the door of the vehicle is locked, and a departure instruction from the terminal device is accepted by the communicator.

(7): In the above-described aspect (6), the first area is an area where the occupant of the vehicle gets into or out of the vehicle whose reservation is completed for causing the vehicle to be parked in the predetermined parking area and the second area is an area where the occupant gets into or out of the vehicle whose reservation is completed or the vehicle whose reservation is not completed, and the driving controller causes the vehicle to depart when the reservation is completed and when the door of the vehicle is locked in a state in which the vehicle whose reservation is not completed is stopped at a position where the occupant is allowed to get out of the vehicle in the second area.

(8): In the above-described aspect (1), the vehicle control device further includes: a communicator configured to communicate with a terminal device of the occupant; and a notification controller configured to provide a notification to the terminal device, wherein the notification controller provides the notification to the terminal device via the communicator when the occupant who has gotten out of the vehicle is a predetermined distance or more away from the vehicle in a state in which the predetermined conditions are not satisfied.

(9): In the above-described aspect (8), the notification controller accepts a simple operation from the terminal device and causes the driving controller to cause the vehicle to depart on the basis of details of a condition that is not satisfied among the predetermined conditions.

(10): In the above-described aspect (1), the driving controller causes the vehicle to depart when the recognizer recognizes that there is no occupant in an interior of the vehicle and that the door of the vehicle is locked.

(11): In the above-described aspect (1), the driving controller causes the vehicle to depart when the recognizer recognizes that there is no terminal device of the occupant who has gotten out of the vehicle in an interior of the vehicle and that the door of the vehicle is locked.

(12): In the above-described aspect (11), the driving controller does not cause the vehicle to depart even though the recognizer recognizes that the door of the vehicle is locked when there is a terminal device of the occupant who has gotten out of the vehicle in the interior of the vehicle.

(13): According to an aspect of the present invention, there is provided a vehicle control method including: recognizing, by a computer, a surrounding environment of a vehicle and recognizing a locking state of the vehicle; performing, by the computer, driving control of one or both of a speed and steering of the vehicle on the basis of a recognition result; and causing, by the computer, the vehicle to depart when a door of the vehicle is locked after an occupant of the vehicle gets out of the vehicle in a predetermined area in a state in which predetermined conditions are satisfied.

(14): According to an aspect of the present invention, there is provided a computer-readable non-transitory storage medium storing a program for causing a computer to: recognize a surrounding environment of a vehicle and recognize a locking state of the vehicle; perform driving control of one or both of a speed and steering of the vehicle on the basis of a recognition result; and cause the vehicle to depart when a door of the vehicle is locked after an occupant of the vehicle gets out of the vehicle in a predetermined area in a state in which predetermined conditions are satisfied.

According to the above-described aspects (1) to (14), it is possible to execute more appropriate driving control.

DESCRIPTION OF EMBODIMENTS

Hereinafter, embodiments of a vehicle control device, a vehicle control method, and a storage medium according to the present invention will be described with reference to the drawings. Hereinafter, an embodiment in which the vehicle control device is applied to an automated driving vehicle will be described as an example. In automated driving, for example, driving control is performed by automatedly controlling one or both of steering and acceleration/deceleration of the vehicle. The driving control may be performed on the automated driving vehicle according to a manual operation of an occupant. Although a case in which left-hand traffic regulations are applied will be described, it is only necessary to reverse the left and right when right-hand traffic regulations are applied.

Overall Configuration

Figure 1:
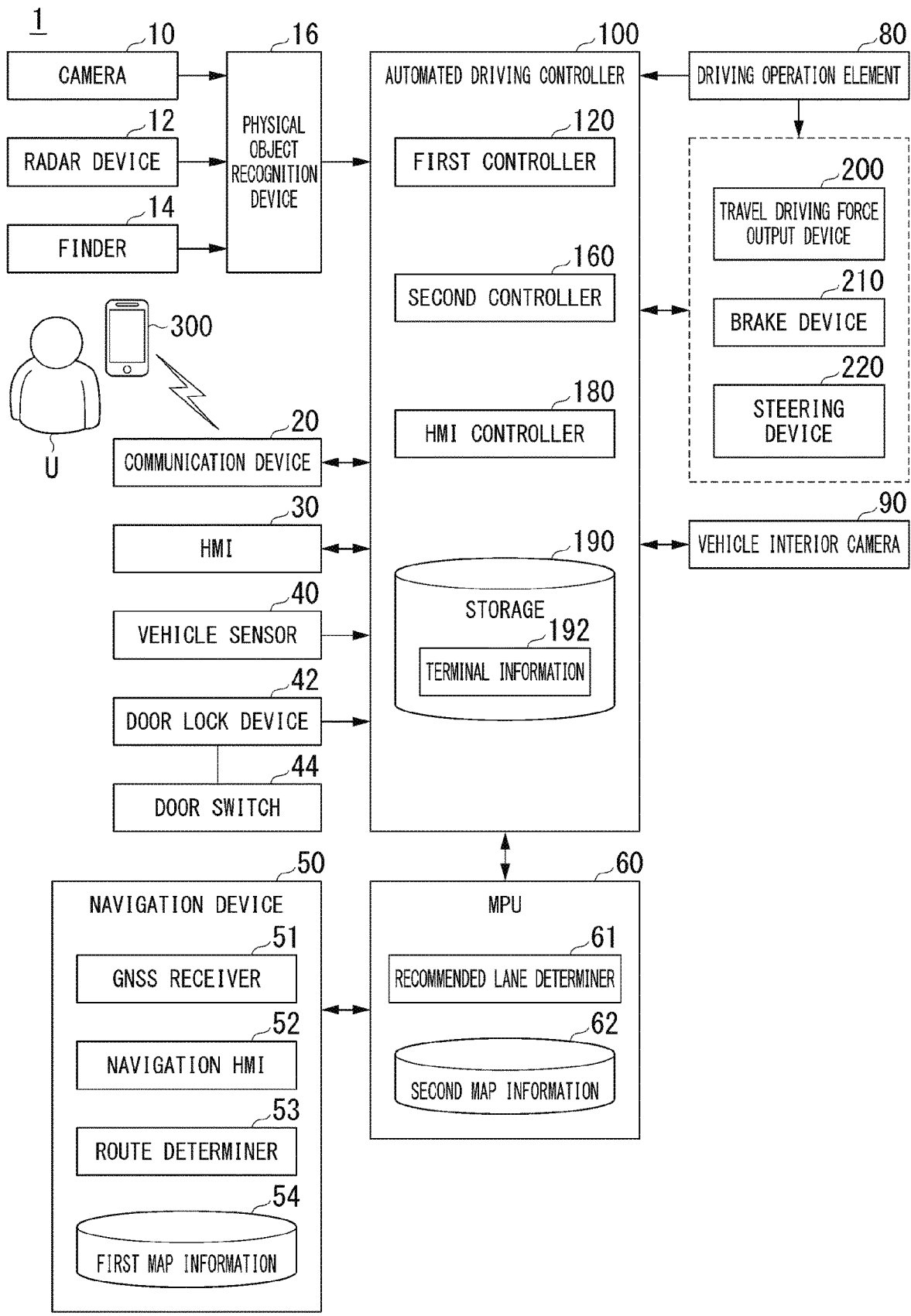
FIG. 1 is a configuration diagram of a vehicle system including a vehicle control device according to an embodiment.

FIG. 1 is a configuration diagram of a vehicle system 1 including a vehicle control device according to an embodiment. For example, a vehicle on which the vehicle system 1 is mounted is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power generated by an electric power generator connected to the internal combustion engine or discharge electric power of a battery (a storage battery) such as a secondary battery or a fuel cell.

For example, the vehicle system 1 includes a camera 10, a radar device 12, a finder 14, a physical object recognition device 16, a communication device 20, a human machine interface (HMI) 30, a vehicle sensor 40, a door lock device 42 a door switch 44, a navigation device 50, a map positioning unit (MPU) 60, a driving operation element 80, a vehicle interior camera 90, an automated driving controller 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added. A combination of the communication device 20, the HMI 30, the door lock device 42, the door switch 44, and the automated driving controller 100 is an example of a "vehicle control device". A combination of the vehicle control device and a terminal device 300 is an example of a "vehicle control system". The communication device 20 is an example of a "communicator". The HMI 30 is an example of an "acceptor". An HMI controller 180 is an example of a "notification controller".

For example, the camera 10 is a digital camera using a solid-state imaging element such as a charge coupled device (CCD) or a complementary metal oxide semiconductor (CMOS). The camera 10 is attached to any position on the vehicle (hereinafter, a vehicle M) on which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any position on the vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the vehicle M and measures scattered light. The finder 14 detects a distance to an object on the basis of time from light emission to light reception. The radiated light is, for example, pulsed laser light. The finder 14 is attached to any position on the vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving controller 100. The physical object recognition device 16 may output detection results of the camera 10, the radar device 12, and the finder 14 to the automated driving controller 100 as they are. The physical object recognition device 16 may be omitted from the vehicle system 1.

For example, the communication device 20 communicates with the terminal device 300 of a user U using the vehicle M and another vehicle or a parking lot management device (to be described below) present in the vicinity of the vehicle M or various types of server devices using, for example, a cellular network or a Wi-Fi network, Bluetooth (registered trademark), dedicated short range communication (DSRC), a local area network (LAN), a wide area network (WAN), or a network such as the Internet. The user U may be, for example, an owner of the vehicle M or a user who only uses the vehicle M through a rental car service, a car sharing service, or the like. The terminal device 300 is, for example, a mobile terminal such as a smartphone or a tablet terminal capable of being possessed by the user U. Hereinafter, the occupant of the vehicle M is assumed to include the user U.

The HMI 30 presents various types of information to an occupant of the vehicle M and accepts an input operation of the occupant. The HMI 30 includes various types of display devices, a speaker, a buzzer, a touch panel, a switch, keys, and the like. The display device includes, for example, a meter display provided in a portion of an instrument panel facing a driver, a center display provided at the center of the instrument panel, a head up display (HUD), and the like. For example, the HUD is a device that allows the occupant to visually recognize an image by superimposing the image on a landscape. As an example, the HUD projects light including an image on a front windshield or a combiner of the vehicle M, thereby allowing the occupant to visually recognize a virtual image.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like. The vehicle sensor 40 may include a door opening or closing sensor configured to detect the opening or closing of the door and a load sensor configured to detect a load of a seat located in the interior of the vehicle. A detection result of the vehicle sensor 40 is output to the automated driving controller 100.

The door lock device 42 locks or unlocks doors provided in the vehicle M. The doors provided in the vehicle M include a driver seat door provided on a driver seat side of the vehicle M, a passenger seat side door provided on a passenger seat side, and back doors provided on a rear seat side. For example, the door lock device 42 locks or unlocks all doors or an indicated door on the basis of a switch operation by the door switch 44 or a lock or unlock instruction from the terminal device 300. Also, the door lock device 42 may be provided with a door key cylinder for each door. In this case, the door lock device 42 locks or unlocks the door by inserting a key of the vehicle M into the door key cylinder and rotating the cylinder in a predetermined direction. When the door is locked or unlocked, the door lock device 42 may operate a buzzer or an emergency flashing indicator light provided in the vehicle M.

The door switch 44 is attached to each door of the vehicle M, and is a switch for locking or unlocking the door according to a switch operation of an occupant from the exterior or interior of the vehicle. Operation details of the switch are output to the door lock device 42. The door switch 44 locks or unlocks the door to which the pressed switch is attached by pressing the switch or all the doors.

The door switch 44 may accept a lock or unlock operation of the door in cooperation with a keyless entry system (a smart entry system) or the like for locking or unlocking the door without using a mechanical key. In this case, the door switch 44 wirelessly communicates with a key unit (a smart key) possessed by the occupant to acquire identification information of the key unit and determines whether or not the key unit is a key unit capable of locking or unlocking the door. The door switch 44 outputs a lock or unlock operation to the door lock device 42 when a distance from a key unit capable of locking or unlocking the door is within a predetermined distance and when a lock or unlock operation on any door is performed.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of the terminal device 300. The navigation device 50 may transmit a current position and a destination to a navigation server via the communication device 20 and acquire a route equivalent to the route on the map from the navigation server. The navigation device 50 outputs the determined route on the map to the MPU 60.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines what number lane the vehicle travels in from the left. The recommended lane determiner 61 determines the recommended lane so that the vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, parking lot information, telephone number information, and the like. The parking lot information includes, for example, a position and a shape of the parking lot, the number of vehicles that can be parked, the availability of automated driving, a getting-into/out area, a stopping area, and the like. The second map information 62 may be updated at any time when the communication device 20 communicates with another device.

For example, the driving operation element 80 includes an accelerator pedal, a brake pedal, a shift lever, a steering wheel, a steering wheel variant, a joystick, and other operation elements. A sensor configured to detect an amount of operation or the presence or absence of an operation is attached to the driving operation element 80, and a detection result thereof is output to the automated driving controller 100 or some or all of the travel driving force output device 200, the brake device 210, and the steering device 220.

The vehicle interior camera 90 is a digital camera using a solid-state imaging device such as a CCD or a CMOS. The vehicle interior camera 90 may be a stereo camera. The vehicle interior camera 90 is attached to any position in the interior of the vehicle M. The vehicle interior camera 90 captures an image of an area including each seat present in the interior of the vehicle. Thereby, it is possible to determine whether or not the occupant or the terminal device 300 is present in the vehicle interior from the image captured by the vehicle interior camera 90. The vehicle interior camera 90 may periodically and iteratively capture an image of the above area or may capture the image at a predetermined timing. The predetermined timing is a timing at which automated driving is started, a timing at which the door of the vehicle M is locked, or the like. The image captured by the vehicle interior camera 90 is output to the automated driving controller 100.

The automated driving controller 100 includes, for example, a first controller 120, a second controller 160, the HMI controller 180, and a storage 190. The first controller 120, the second controller 160, and the HMI controller 180 are implemented, for example, by a hardware processor such as a central processing unit (CPU) executing a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by software and hardware in cooperation. The above-described program may be pre-stored in a storage device such as an HDD or a flash memory of the automated driving controller 100 (a storage device including a non-transitory storage medium, for example, a storage 190) or may be installed in the storage device of the automated driving controller 100 when the program is stored in a removable storage medium such as a DVD, a CD-ROM, or a memory card and the storage medium (the non-transitory storage medium) is mounted on a drive device, a card slot, or the like.

Figure 2:
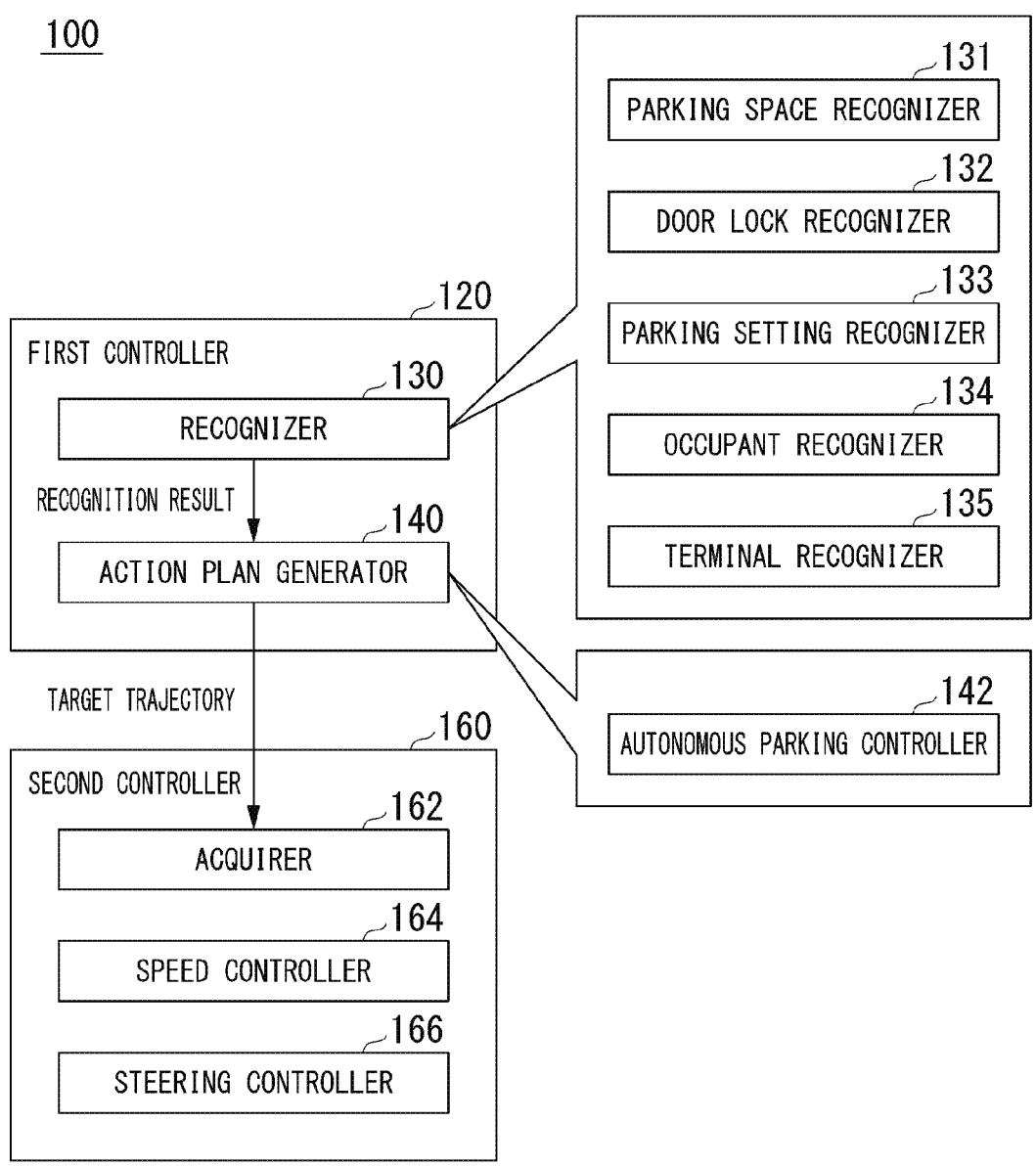
FIG. 2 is a functional configuration diagram of a first controller and a second controller.

FIG. 2 is a functional configuration diagram of the first controller 120 and the second controller 160. The first controller 120 includes, for example, a recognizer 130, and an action plan generator 140. A combination of the action plan generator 140 and the second controller 160 is an example of a "driving controller". For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured. For example, the first controller 120 executes control related to automated driving of the vehicle M on the basis of an instruction from the MPU 60, the HMI controller 180, or the like and an instruction from the terminal device 300.

The recognizer 130 recognizes a surrounding environment of the vehicle M on the basis of information input from the camera 10, the radar device 12, and the finder 14 via the physical object recognition device 16. For example, the recognizer 130 recognizes a state such as a position, velocity, or acceleration of a physical object present in the vicinity of the vehicle M on the basis of the input information. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by a represented region. When the physical object is a moving object such as another vehicle, the "state" of the physical object may include acceleration or jerk of the physical object or an "action state" (for example, whether or not a lane change is being made or intended).

For example, the recognizer 130 recognizes a lane in which the vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the vehicle M recognized from an image captured by the camera 10. The recognizer 130 may recognize a travel lane by recognizing a traveling path boundary (a road boundary) including a road dividing line, a road shoulder, a curb stone, a median strip, a guardrail, or the like as well as a road dividing line. In this recognition, a position of the vehicle M acquired from the navigation device 50 or a processing result of the INS may be added. The recognizer 130 recognizes a temporary stop line, an obstacle, red traffic light, a toll gate, an entrance/exit gate of a parking area, a stopping area, a getting-into/out area, and other road events.

When the travel lane is recognized, the recognizer 130 recognizes a position or orientation of the vehicle M with respect to the travel lane. For example, the recognizer 130 may recognize a gap of a reference point of the vehicle M from the center of the lane and an angle formed with respect to a line connecting the center of the lane in the travel direction of the vehicle M as a relative position and orientation of the vehicle M related to the travel lane. Alternatively, the recognizer 130 may recognize a position of the reference point of the vehicle M related to one side end portion (a road dividing line or a road boundary) of the travel lane or the like as a relative position of the vehicle M related to the travel lane.

The recognizer 130 includes, for example, a parking space recognizer 131, a door lock recognizer 132, a parking setting recognizer 133, an occupant recognizer 134, and a terminal recognizer 135. Details of functions of the parking space recognizer 131, the door lock recognizer 132, the parking setting recognizer 133, the occupant recognizer 134, and the terminal recognizer 135 will be described below.

The action plan generator 140 generates an action plan for causing the vehicle M to travel according to automated driving. For example, the action plan generator 140 generates a future target trajectory along which the vehicle M automatedly travels (independently of a driver's operation) so that the vehicle M can generally travel in the recommended lane determined by the recommended lane determiner 61 and further cope with a surrounding situation of the vehicle M on the basis of a recognition result of the recognizer 130. For example, the target trajectory includes a speed element. For example, the target trajectory is represented by sequentially arranging points (trajectory points) at which the vehicle M is required to arrive. The trajectory points are points at which the vehicle M is required to arrive for each predetermined traveling distance (for example, about several meters [m]) along a road. In addition, a target speed and target acceleration for each predetermined sampling time (for example, about several tenths of a second [sec]) are generated as parts of the target trajectory. The trajectory point may be a position at which the vehicle M is required to arrive at the sampling time for each predetermined sampling time. In this case, information about the target speed or the target acceleration is represented by an interval between the trajectory points.

The action plan generator 140 may set an automated driving event when the target trajectory is generated. The automated driving event includes a constant-speed traveling event, a low-speed following traveling event, a lane change event, a branching event, a merging event, a takeover event, an autonomous parking event for parking the vehicle according to automated driving in a parking lot in a valet parking or the like, and the like. The action plan generator 140 generates a target trajectory according to the activated event. For example, the action plan generator 140 includes an autonomous parking controller 142 that is activated when the autonomous parking event is executed. Details of the function of the autonomous parking controller 142 will be described below.

The second controller 160 controls the travel driving force output device 200, the brake device 210, and the steering device 220 so that the vehicle M passes through the target trajectory generated by the action plan generator 140 at a scheduled time.

The second controller 160 includes, for example, an acquirer 162, a speed controller 164, and a steering controller 166. The acquirer 162 acquires information of a target trajectory (trajectory points) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a degree of curve of a target trajectory stored in the memory. For example, processes of the speed controller 164 and the steering controller 166 are implemented by a combination of feed-forward control and feedback control. As one example, the steering controller 166 executes feed-forward control according to the curvature of the road in front of the vehicle M and feedback control based on a deviation from the target trajectory in combination.

Returning to FIG. 1, the HMI controller 180 notifies the occupant of predetermined information by means of the HMI 30. The predetermined information may include information related to traveling of the vehicle M such as information about the state of the vehicle M and information about driving control. The information about the state of the vehicle M includes, for example, a speed of the vehicle M, an engine speed, a shift position, and the like. The information about the driving control includes, for example, information about whether or not automated driving is to be executed, information about presetting for starting automated driving, information for asking about whether or not to start automated driving, information about a degree of driving assistance based on automated driving, and the like. The predetermined information may include information that is not related to the traveling of the vehicle M, such as content (for example, a movie) stored in a storage medium such as a TV program or a DVD. The predetermined information may include, for example, information about a communication state between the vehicle M and the terminal device 300, a current position and a destination in automated driving, and the remaining amount of fuel of the vehicle M. The HMI controller 180 may output information received by the HMI 30 to the communication device 20, the navigation device 50, the first controller 120, and the like.

The HMI controller 180 may communicate with the terminal device 300 stored in the terminal information 192 via the communication device 20 and transmit predetermined information to the terminal device 300. The HMI controller 180 may cause the HMI 30 to output information acquired from the terminal device 300.

For example, the HMI controller 180 may perform control for causing the display device of the HMI 30 to display a registration screen for registering the terminal device 300 that communicates with the vehicle M and causing information about the terminal device 300 input via the registration screen to be stored in the storage 190 as terminal information 192. The above-described registration of the terminal information 192 is executed, for example, at a predetermined timing when the user U gets into the vehicle or before the automated driving such as the autonomous parking event is started. The above-described registration of the terminal information 192 may be performed by an application program (a vehicle cooperation application to be described below) installed in the terminal device 300.

The HMI controller 180 may transmit the information obtained by the HMI 30 and the HMI controller 180 to the terminal device 300 or another external device via the communication device 20.

The storage 190 is implemented by, for example, an HDD, a flash memory, an EEPROM, a read only memory (ROM), a random access memory (RAM), or the like. The storage 190 stores, for example, the terminal information 192, the program, and other information.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated by an operation of the brake pedal included in the driving operation element 80 to the cylinder via a master cylinder as a backup. Also, the brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element to change the direction of the steerable wheels.

Terminal Device 300

Figure 3:
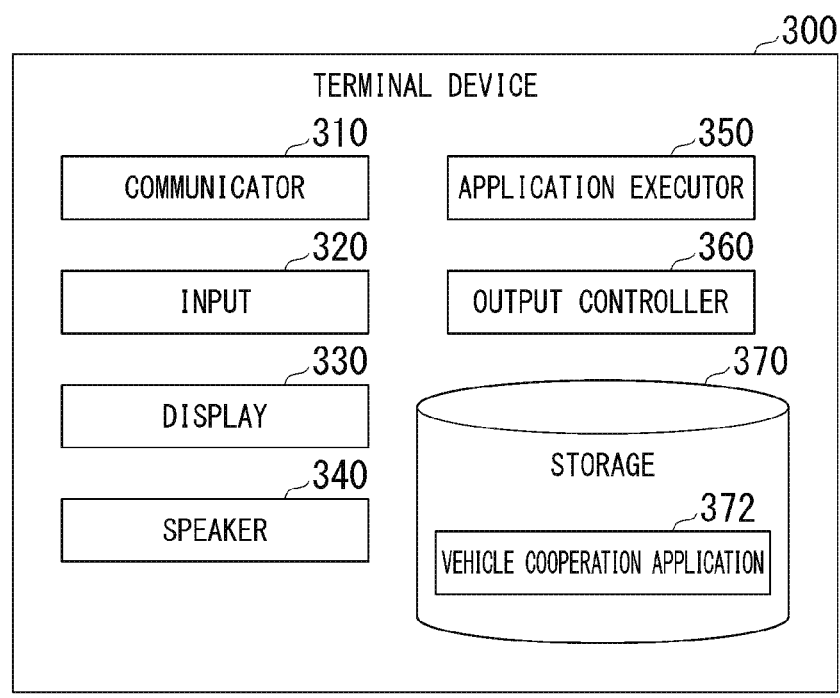
FIG. 3 is a diagram showing an example of a functional configuration of a terminal device.

FIG. 3 is a diagram showing an example of a functional configuration of the terminal device 300. The terminal device 300 includes, for example, a communicator 310, an input 320, a display 330, a speaker 340, an application executor 350, an output controller 360, and a storage 370. The communicator 310, the input 320, the application executor 350, and the output controller 360 are implemented, for example, by a hardware processor such as a CPU executing a program (software). Some or all of these components are implemented, for example, by hardware (a circuit including circuitry) such as LSI, an ASIC, an FPGA, or a GPU or may be implemented by software and hardware in cooperation. The above-described program may be pre-stored in a storage device such as an HDD or a flash memory provided in the automated driving controller 100 (a storage device including a non-transitory storage medium, for example, the storage 370) or may be installed in the storage device of the terminal device 300 when the program is stored in a removable storage medium such as a DVD, a CD-ROM, or a memory card and the storage medium (the non-transitory storage medium) is mounted on a drive device, a card slot, or the like.

For example, the communicator 310 communicates with the vehicle M and other external devices using a cellular network, a Wi-Fi network, Bluetooth (registered trademark), a DSRC, a network such as a LAN, a WAN, or the Internet.

For example, the input 320 accepts the input from a user by operating various types of keys and buttons and the like. The display 330 is, for example, a liquid crystal display (LCD) or the like. The input 320 may be configured integrally with the display 330 as a touch panel. The display 330 displays information about automated driving in the embodiment and other information necessary for using the terminal device 300 according to the control of the output controller 360. For example, the speaker 340 outputs a predetermined sound according to the control of the output controller 360.

The application executor 350 is implemented by executing the vehicle cooperation application 372 stored in the storage 370. The vehicle cooperation application 372 is, for example, an application program (an application) for communicating with the vehicle M via a network and transmitting an entering instruction or a leaving instruction based on automated driving to the vehicle M. The vehicle cooperation application 372 may have a function (for example, an electronic key function) of transmitting an instruction for locking or unlocking the door of the vehicle M or starting or stopping the engine to the vehicle M.

The vehicle cooperation application 372 acquires information transmitted by the vehicle M and causes the output controller 360 to provide a predetermined notification on the basis of the acquired information. For example, when the communicator 310 receives information about the vehicle identification from the vehicle M after the leaving instruction is issued, the application executor 350 executes control for causing the display 330 to display an image or causing the speaker 340 to output a sound on the basis of notification details and the like associated with the information about the vehicle identification.

The vehicle cooperation application 372 may transmit position information of the terminal device 300 acquired by a global positioning system (GPS) device (not shown) built in the terminal device 300 to the vehicle M, register the terminal information, the notification details, and the like, or perform other processes related to vehicle cooperation.

The output controller 360 controls details or a display mode of an image displayed on the display 330 and details or an output mode of a sound to be output to the speaker 340. For example, the output controller 360 may cause the display 330 to display information about driving control (automated entering and automated leaving) from the vehicle M, information indicating a locked state or an unlocked state (hereinafter referred to as a locking state) of the door, information for inquiring about an instruction of the driving control and the locking state, and the like or cause the speaker 340 to output a sound corresponding to the above-described information. The output controller 360 may acquire an image or a sound corresponding to the notification details from an external device or generate an image or a sound within the terminal device 300 to cause the image or the sound to be output from the display 330 and the speaker 340. The output controller 360 may cause information indicated by the vehicle cooperation application 372 and various types of information necessary for using the terminal device 300 to be output from the display 330 and the speaker 340.

The storage 370 is implemented by, for example, an HDD, a flash memory, an EEPROM, a ROM, a RAM, or the like. For example, the vehicle cooperation application 372, the program, and other information are stored in the storage 370.

Driving Control

Next, the driving control based on the automated driving according to the embodiment will be specifically described. Hereinafter, an example of the driving control in the traveling based on the automated driving of the vehicle M will be described using a scene in which autonomous parking is performed in traveling based on the automated driving in valet parking of a destination facility to be visited. In the following, "unmanned traveling" in which the vehicle travels in an unmanned manner is assumed to be used as an example of "traveling based on automated driving". The automated driving in the present embodiment may be performed in a state in which the occupant is in the vehicle.

Figure 4:
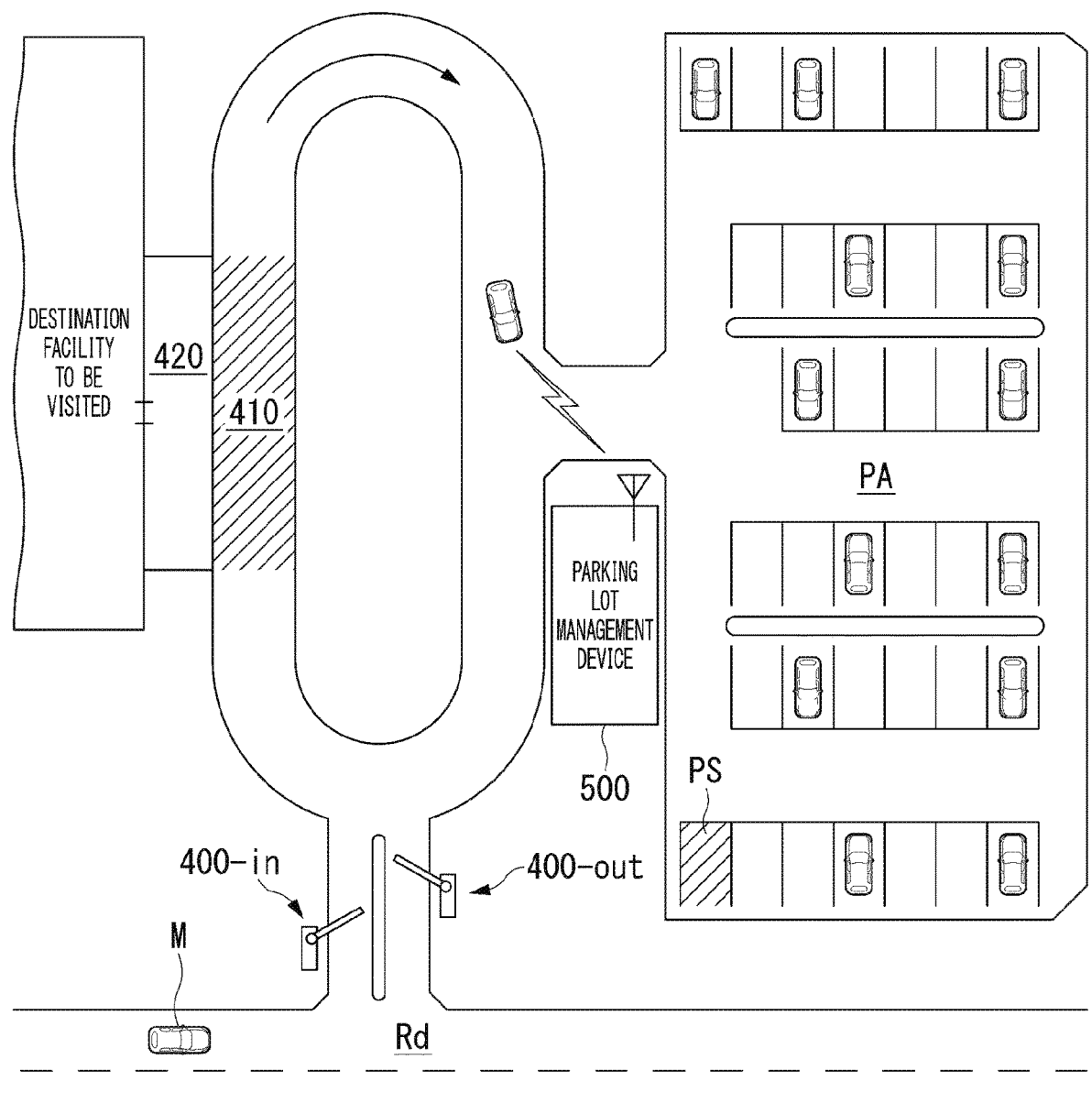
FIG. 4 is a diagram schematically showing a scene in which an autonomous parking event is executed in the embodiment.

FIG. 4 is a diagram schematically showing a scene in which an autonomous parking event is executed in the embodiment. In the example of FIG. 4, a parking lot (for example, valet parking) PA of the destination facility to be visited is shown. In the parking lot PA, gates 400-in and 400-out, a stopping area 410, and a getting-into/out area 420 are assumed to be provided along a route from a road Rd to the destination facility to be visited. The getting-into/out area 420 is an example of a "predetermined area". The getting-into/out area 420 may be divided into a getting-into area and a getting-out area. The getting-into/out area may include, for example, a reserved getting-into/out area (an example of a first area) where an occupant of a vehicle whose reservation is completed in advance to enter a predetermined parking area of the parking lot PA will get into or out of the vehicle and a free getting-into/out area (an example of a second area) where an occupant of a vehicle whose reservation is completed as described above or an occupant of a vehicle whose reservation is not completed can get into or out of the vehicle. In the example of FIG. 4, the parking lot management device 500 that manages a parking situation of the parking lot PA and a reservation situation of entering or leaving and transmits an availability situation and the like to the vehicle is assumed to be provided.

Here, processing at the time of automated entering and automated leaving of the vehicle M in an autonomous parking event will be described. The processing at the time of entering and leaving is executed according to, for example, the reception of an entering instruction and a leaving instruction from the terminal device 300, the elapse of a preset time, or another execution condition which is satisfied.

Autonomous Parking Event-When Automated Entering is Performed

For example, the autonomous parking controller 142 causes the vehicle M to be parked within a parking space in the parking lot PA on the basis of information acquired from the parking lot management device 500 by means of the communication device 20. In this case, the vehicle M proceeds to the stopping area 410 through the gate 400-in according to manual driving or automated driving. The stopping area 410 faces the getting-into/out area 420 connected to a destination facility to be visited. The getting-into/out area 420 is provided with eaves for avoiding rain and snow.

After the occupant (hereinafter, a user U) gets out of the vehicle in the stopping area 410, the vehicle M performs unmanned automated driving and starts an autonomous parking event in which the vehicle moves to the parking space PS within the parking lot PA. A start trigger of the autonomous parking event is, for example, a case in which the door of the vehicle M is locked after the user U gets out of the vehicle in the getting-into/out area 420 in a state in which predetermined conditions are satisfied. The start trigger may be any operation of the user U (for example, an entering instruction from the terminal device 300) or may be a predetermined signal wirelessly received from the parking lot management device 500. Specific control details in a scene in which the automated parking event is started will be described below.

When the autonomous parking event starts, the autonomous parking controller 142 controls the communication device 20 so that the communication device 20 transmits a parking request to the parking lot management device 500. The vehicle M moves from the stopping area 410 to the parking lot PA in accordance with the guidance of the parking lot management device 500 or while performing sensing on its own.

Figure 5:
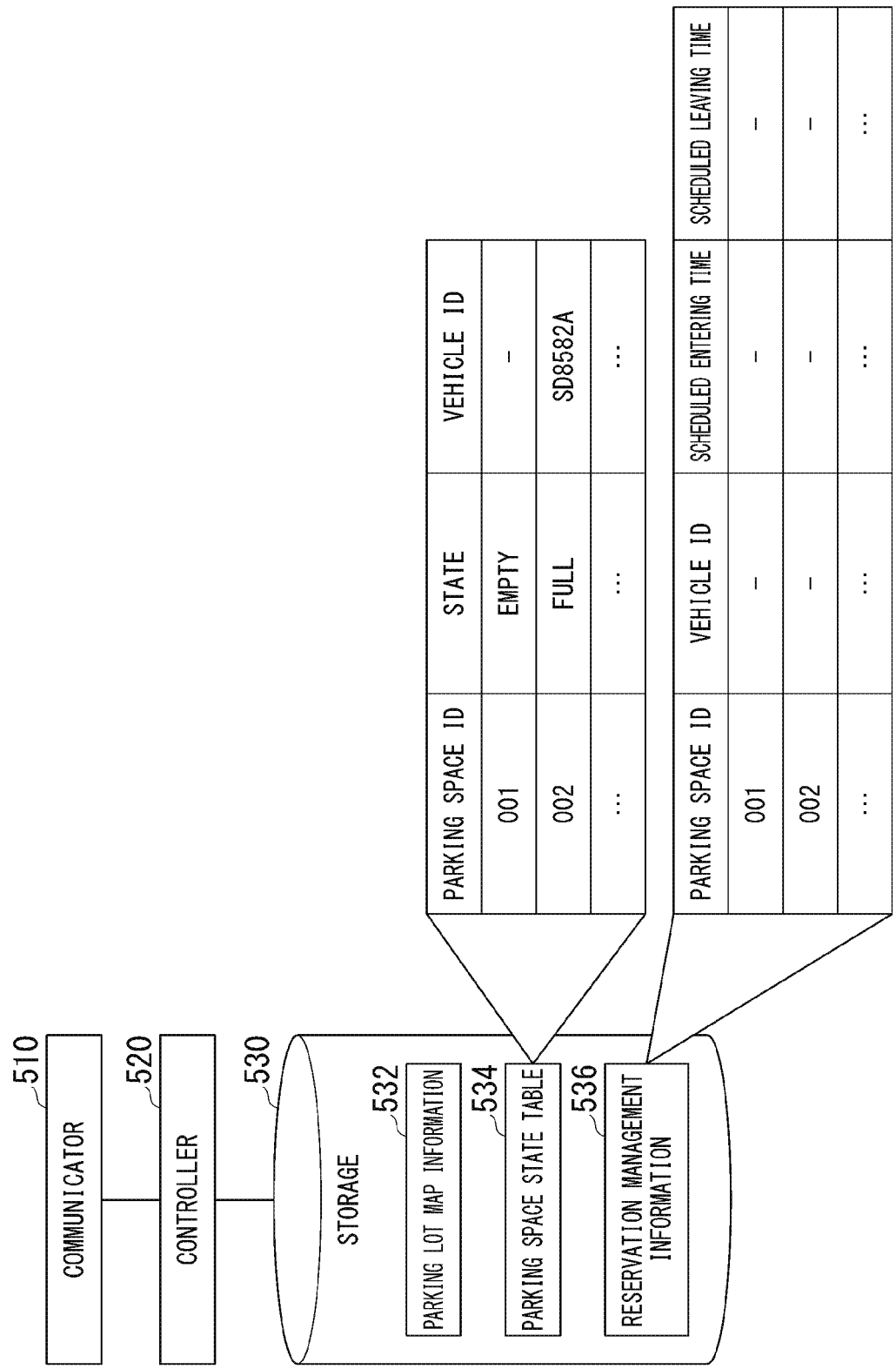
FIG. 5 is a diagram showing an example of a configuration of a parking lot management device.

FIG. 5 is a diagram showing an example of the configuration of the parking lot management device 500. The parking lot management device 500 includes, for example, a communicator 510, a controller 520, and a storage 530. The storage 530 stores information such as parking lot map information 532, a parking space state table 534, and reservation management information 536.

The communicator 510 wirelessly communicates with the vehicle M, other vehicles, and the like. The controller 520 guides the vehicle to the parking space PS on the basis of information acquired by the communicator 510 and information stored in the storage 530.

The parking lot map information 532 is information geometrically representing the structure of the parking lot PA. The parking lot map information 532 includes coordinates for each parking space PS. In the parking space state table 534, for example, a state which is an empty state or a full (parked) state and a vehicle ID which is identification information of a parked vehicle in the case of the full state are associated with a parking space ID which is identification information of the parking space PS. The reservation management information 536 is information in which a vehicle ID, a scheduled entering time, and a scheduled leaving time are associated with a vehicle space ID. The reservation management information 536 may include position information of the stopping area 410 corresponding to the getting-into/out area 420 where the user U is allowed to get into or out of the vehicle.

For example, when the use reservation information of the parking lot PA (for example, one or both of the scheduled entering time and the scheduled leaving time) is accepted from the user U, the HMI 30 or the terminal device 300 of the vehicle M transmits the vehicle ID and the use reservation information to the parking lot management device 500. When the vehicle ID and the use reservation information are received by the communicator 510, the controller 520 of the parking lot management device 500 extracts the parking space ID whose parking space is available at the scheduled entering time with reference to the parking space state table 534, the reservation management information 536, and the like and stores the use reservation information (the vehicle ID, the scheduled entering time, and the scheduled leaving time) in the same parking space ID included in the reservation management information 536. Thereby, the reservation before parking is completed. When the reservation has been completed, the controller 520 transmits the parking space ID to the vehicle M or the terminal device 300 transmitting the vehicle ID and the use reservation information via the communicator 510. If there is no parking space that can be reserved, the controller 520 transmits information indicating that there is no parking space that can be reserved to the vehicle M or the terminal device 300 transmitting the vehicle ID and the use reservation information.

When the communicator 510 receives a parking request from the vehicle, the controller 520 determines whether or not there is a reserved parking space with reference to reservation management information 536 on the basis of the vehicle ID transmitted with the request. When the parking space has been reserved, a position of the parking space (for example, the parking space PS) is acquired from the parking lot map information 532 and a suitable route to the acquired position of the parking space PS is transmitted to the vehicle using the communicator 510. When no parking space has been reserved (when no advance reservation has been completed), the controller 520 extracts the parking space PS whose state is an empty state with reference to the parking space state table 534, acquires a position of the extracted parking space PS from the parking lot map information 532, and transmits a suitable route to the acquired position of the parking space PS to the vehicle using the communicator 510. The controller 520 instructs a specific vehicle to stop or slow down as necessary on the basis of a positional relationship of a plurality of vehicles so that the vehicles do not move to the same position at the same time.

In the vehicle receiving the route (hereinafter referred to as the vehicle M), the autonomous parking controller 142 generates a target trajectory based on the route. When the vehicle M approaches the target parking space PS, the parking space recognizer 131 recognizes parking slot lines that partition the parking space PS and the like, recognizes a detailed position of the parking space PS, and provides the recognized position to the autonomous parking controller 142. The autonomous parking controller 142 receives the provided position to correct the target trajectory and cause the vehicle M to be parked in the parking space PS.

The autonomous parking controller 142 may find an empty parking space on its own on the basis of a detection result of the camera 10, the radar device 12, the finder 14, or the physical object recognition device 16 independently of communication and cause the vehicle M to be parked within the found parking space without being limited to the above description.

Autonomous Parking Event-When Automated Leaving is Performed

The autonomous parking controller 142 and the communication device 20 also maintain the operating state when the vehicle M is parked. For example, when the communication device 20 has received a pick-up request (an example of a leaving instruction) from the terminal device 300 or when the leaving reservation time has been reached, the autonomous parking controller 142 causes the system of the vehicle M to be activated and causes the vehicle M to be moved to the stopping area 410. At this time, the autonomous parking controller 142 controls the communication device 20 so that the communication device 20 transmits a departure request to the parking lot management device 500. The controller 520 of the parking lot management device 500 instructs a specific vehicle to stop or slow down as necessary on the basis of a positional relationship of a plurality of vehicles so that the vehicles do not move to the same position at the same time as in the entering process.

The autonomous parking controller 142 determines whether or not the user U is present in the getting-into/out area (the getting-into area when the getting-into area and getting-out area are separated) 420 and causes the vehicle M to be parked in an empty space of the stopping area 410 within a predetermined distance from a position where the user U is present when it is determined that the user U is present. In this case, the autonomous parking controller 142 acquires the position information from the terminal device 300 and determines that the user U is present in the getting-into/out area 420 when the acquired position information is within the getting-into/out area 420. The autonomous parking controller 142 may determine whether or not the user U is present in the getting-into/out area 420 on the basis of a detection result of the camera 10, the radar device 12, the finder 14, or the physical object recognition device 16. In this case, the autonomous parking controller 142 previously acquires feature information of the user U from the detection result of the camera 10, the radar device 12, the finder 14, or the physical object recognition device 16 before the vehicle M enters the parking lot. The autonomous parking controller 142 compares feature information of a person obtained from the detection result at the time of leaving with the feature information of the user U and determines that the user U is present when a degree of similarity is greater than or equal to a predetermined value.

After the user U gets into the vehicle after stopping, the autonomous parking controller 142 stops the operation and the manual driving or the automated driving by another functional part is subsequently started. In this case, for example, when opening or closing of the door of the vehicle M is detected, an operation on the driving operation element 80 or the HMI 30 is accepted, or it is detected that a load on a vehicle interior seat is greater than or equal to a predetermined value, the autonomous parking controller 142 determines that the user U has gotten into the vehicle.

When it is determined that the user U is not present in the getting-into/out area 420, the autonomous parking controller 142 may perform control for causing the vehicle M to slow down and delaying the time of the vehicle M arriving at the stopping area 410. Thereby, it is possible to shorten a waiting time period in the stopping area 410 and reduce traffic congestion in the stopping area 410.

When a time period elapsed after stopping in the stopping area 410 is greater than or equal to a predetermined time period and a getting-into process of the user U is not detected, the autonomous parking controller 142 may generate a circulation path along which the vehicle goes round the stopping area 410 and execute automated driving in which the vehicle goes round the stopping area 410 along the circulation path. When the above-described conditions are satisfied, the autonomous parking controller 142 may execute automated driving for causing the vehicle to be parked in the parking lot PA again. Thereby, traffic congestion in the stopping area 410 can be minimize.

Specific Control Details in Scene in Which Automated Parking Event is Started

Next, specific control details in a scene in which an automated parking event is started in an entering process will be described. Hereinafter, some control patterns will be described.

First Control Pattern

The door lock recognizer 132 recognizes the locking state of the door in a state in which the vehicle M has stopped in the stopping area 410. For example, the door lock recognizer 132 recognizes the locking state of the door of the vehicle M from the locked state of the door lock device 42. The occupant recognizer 134 analyzes an image captured by the vehicle interior camera 90 and recognizes whether or not the user U sitting in the seat has gotten out of the vehicle. The occupant recognizer 134 may recognize a seat in which the user U sits in the interior of the vehicle according to a magnitude of a load of the seat or an amount of change in the load of the seat using the vehicle sensor 40 in addition to (in place of) use of an image captured by the vehicle interior camera 90. The occupant recognizer 134 may recognize whether or not the user U sitting in the driver's seat has gotten out of the vehicle or whether or not all occupants including occupants other than the user U have gotten out of the vehicle using the vehicle interior camera 90 or the vehicle sensor 40. The occupant recognizer 134 may recognize that the occupant is in the vehicle M and a seat in which the occupant sits using the vehicle interior camera 90 or the vehicle sensor 40.

The autonomous parking controller 142 generates an action plan for causing the vehicle M to depart so that the vehicle M is parked in a predetermined parking area according to an automated parking event when the door lock recognizer 132 recognizes that the door of the vehicle M is locked after the occupant recognizer 134 recognizes that the user U of the vehicle M has gotten out of the vehicle M in a predetermined area in a state in which predetermined conditions are satisfied.

Here, the predetermined condition in the first control pattern is that a setting of a mode in which the vehicle M automatedly enters the predetermined parking space PS before the user U gets out of the vehicle M (hereinafter referred to as an automated entering mode) is accepted. For example, the parking setting recognizer 133 determines whether or not the setting of the automated entering mode has been accepted according to the operation of the user U on a setting screen displayed on the HMI 30 or the terminal device 300.

Figure 6:
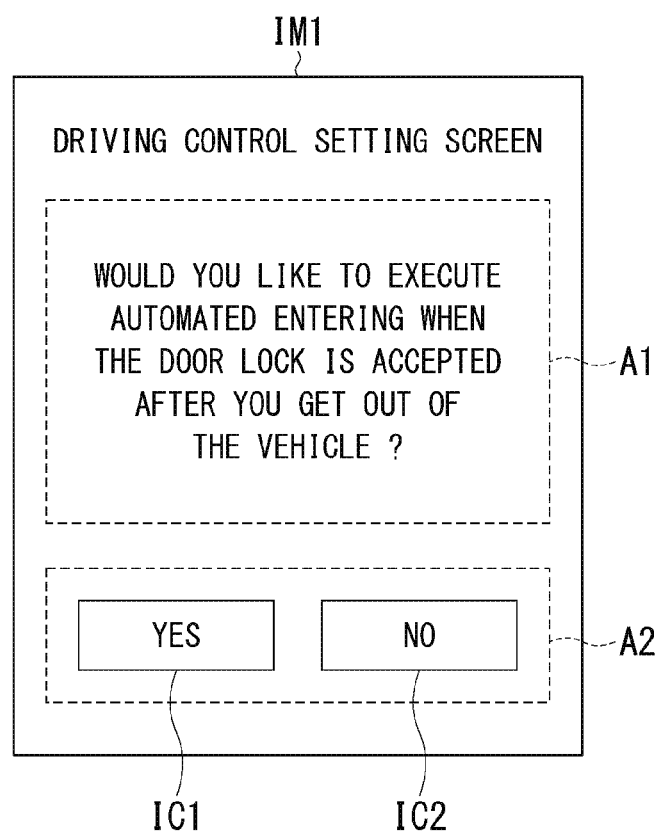
FIG. 6 is a diagram showing an example of an automated entering setting image displayed on a display device of an HMI.

FIG. 6 is a diagram showing an example of an automated entering setting image displayed on the display device of the HMI 30. For example, the image IM1 shown in FIG. 6 is generated by the HMI controller 180 when the image IM1 is displayed on the HMI 30 and is generated by the output controller 360 when the image IM1 is displayed on the display 330 of the terminal device 300. A layout and displayed details of the image shown in FIG. 6 are not limited to the following details. The same applies to examples of images of FIG. 7 and subsequent drawings. The image IM1 shown in FIG. 6 may be displayed according to a display instruction from the user U or may be displayed when the position of the vehicle M is within a predetermined distance from the destination facility to be visited.

The parking setting recognizer 133 causes the HMI controller 180 to generate an image IM1 for causing the user U to set driving control such as the automated entering mode and causes the display device of the HMI 30 to output the generated image IM1. In the example of FIG. 6, the image IM1 includes a text information display area A1 and a selection item display area A2 as a driving control setting screen. In the text information display area A1, for example, text information for asking about whether or not an automated parking event may be executed according to a door lock operation of the vehicle M after a getting-out process is displayed. In the example of FIG. 6, text information indicating that "Would you like to execute automated entering when the door lock is accepted after you get out of the vehicle?" is displayed in the text information display area A1.

The selection item display area A2 includes a graphical user interface (GUI) icon IC1 (a YES button) for permitting details displayed by the text information display area A1 and a GUI icon IC2 (a NO button) for rejecting the displayed details. When the operation of the user U on the GUI icon IC1 has been accepted and when the door of the vehicle M has been locked, the parking setting recognizer 133 determines that the automated entering mode in which automated entering is allowed has been set. When the operation of the user U on the GUI icon IC2 has been accepted and when the door of the vehicle M has been locked, the parking setting recognizer 133 determines that a setting for rejecting automated entering of the vehicle M has been accepted (in other words, the mode has not been set as the automated entering mode).

The parking setting recognizer 133 may accept the mode setting of the user U by causing the HMI controller 180 to generate a sound having details similar to that of the text information display area A1 of the image IM1 shown in FIG. 6, causing the speaker of the HMI 30 to output the sound, and acquiring a sound of an answer from the speaker.

By performing the above-described setting before the user U gets out of the vehicle, for example, the autonomous parking controller 142 executes the automated parking event for causing the vehicle M to be parked in a parking area when the setting of the automated entering mode is accepted, the user U gets out of the vehicle M in the getting-into/out area 420, and all doors of the vehicle M are locked. The autonomous parking controller 142 does not execute the automated parking event for causing the vehicle M to be parked in the parking area even though the user U gets out of the vehicle in the getting-into/out area 420 and all the doors of the vehicle M are locked in a state in which the setting of the automated entering mode is not accepted. Thereby, when the door lock instruction has been accepted, it is possible to prevent the automated entering process from being performed against the intention of the user U.

Second Control Pattern

Next, a second control pattern will be described. The following description focuses on differences from the first control pattern and the description of similar control details will be omitted. The same applies to the description of the subsequent control patterns. In the second control pattern, instead of the predetermined condition of the first control pattern, a condition that the vehicle enters a destination facility to be visited including a parking lot PA where automated entering or automated leaving is possible (i.e., an area where the vehicle is allowed to travel according to driving control) is given. For example, the entering process may be a process in which the vehicle passes through the gate 400-in, a process in which the vehicle enters the stopping area 410, or a process in which the vehicle travels at a position within a predetermined distance from the stopping area 410.

The autonomous parking controller 142 generates an action plan for causing the vehicle M to depart when it is recognized that the vehicle enters the destination facility to be visited including the parking lot PA where automated entering or automated leaving is possible and when the door of the vehicle M is locked after the user U gets out of the vehicle M in the getting-into/out area 420. Thereby, it is possible to cause an entering or leaving process to be smoothly executed according to a simple operation for an entering vehicle on the assumption that a vehicle is parked by valet parking.

Third Control Pattern

Figure 7:
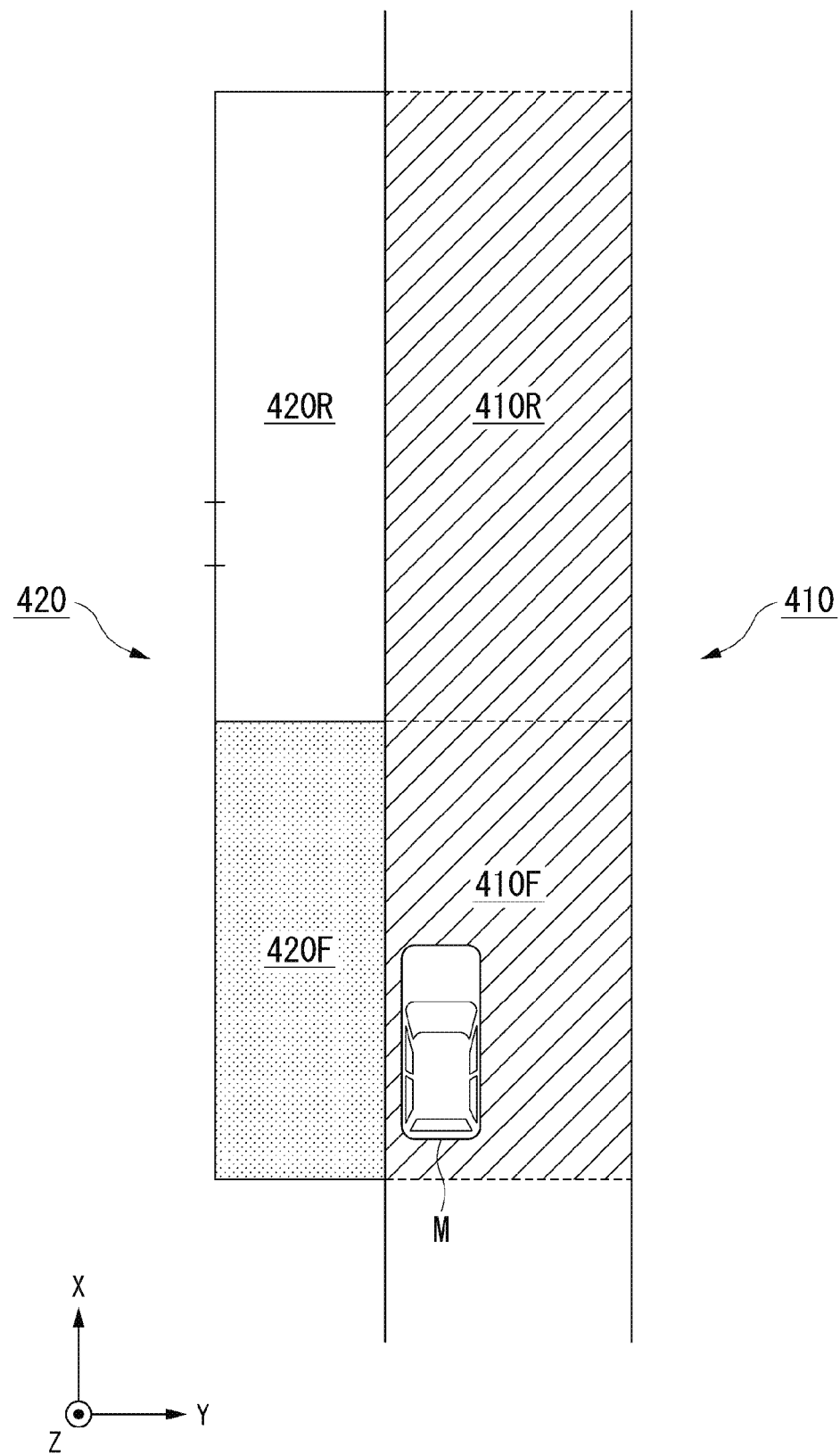
FIG. 7 is a diagram for describing a reserved getting-into/out area and a free getting-into/out area included in a getting-into/out area.

Next, a third control pattern will be described. The third control pattern makes a predetermined condition for causing the vehicle M to perform automated entering different according to the above-described reserved getting-into/out area (the example of the first area) or the above-described free getting-into/out area (the example of the second area) where the vehicle M is stopped. FIG. 7 is a diagram for describing a reserved getting-into/out area 420R and a free getting-into/out area 420F included in the getting-into/out area 420. Although the free getting-into/out area 420F is provided on an entering side of the stopping area 410 and the reserved getting-into/out area 420R is provided on a back side thereof (a back side in an X-axis direction) in the example of FIG. 7, the present invention is not limited thereto. For example, the reserved getting-into/out area 420R may be provided on the entering side of the stopping area 410 and the free getting-into/out area 420F may be provided on the back side thereof. Each getting-into/out area may be provided as a separate getting-into/out lane. In the example of FIG. 7, a vehicle stopping area for allowing the user U to get into or out of the vehicle in the free getting-into/out area 420F is set as a free stopping area 410F and a vehicle stopping area for allowing the user U to get into or out of the vehicle in the reserved getting-into/out area 420R is set as a reserved stopping area 410R. It is assumed that the user U stops the vehicle while visually recognizing the reserved getting-into/out area 420R and the free getting-into/out area 420F when the vehicle is stopped according to manual driving, the vehicle is stopped in the reserved stopping area 410R by the automated driving controller 100 if a reservation is completed before a getting-into/out process when the vehicle is stopped according to automated driving on the basis of the reservation management information 536 or the like, and the vehicle is stopped in the free stopping area 410F by the automated driving controller 100 when the reservation is not completed.

For example, when all the doors of the vehicle M are locked after the user U gets out of the vehicle M in the reserved getting-into/out area 420R, the autonomous parking controller 142 executes the automated parking event and causes the vehicle M to depart. Thereby, driving control of an entering process intended by the occupant can be smoothly executed by a simple operation.

When the vehicle is stopped in the free stopping area 410F as shown in FIG. 7 and the door of the vehicle M is locked after the user U is allowed to get out of the vehicle in the free getting-into/out area 420F, the autonomous parking controller 142 sends an inquiry as to whether or not the entering process is to be performed to the terminal device 300 through the HMI controller 180.

Figure 8:
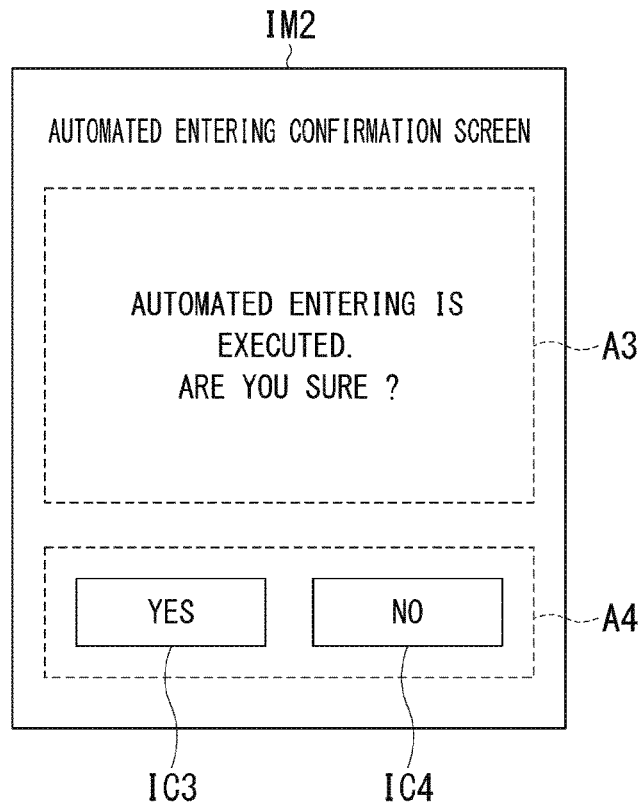
FIG. 8 is a diagram showing an example of an entering confirmation image provided to a terminal device through a notification after a lock operation.

FIG. 8 is a diagram showing an example of an entering confirmation image of a notification provided to the terminal device 300 after the lock operation. The image IM2 shown in FIG. 8 is an image generated by the output controller 360 of the terminal device 300 according to an instruction of the HMI controller 180 and displayed on the display 330. In the example of FIG. 8, the image IM2 includes a text information display area A3 and a selection item display area A4 as an automated entering confirmation screen. The text information display area A3 displays, for example, text information for asking the user U about whether or not to execute an automated parking event after the door is locked according to the acceptance of a door lock operation of the vehicle M after the getting-out process. In the example of FIG. 8, text information indicating that "Automated entering is executed. Are you sure?" is displayed in the text information display area A3.

The selection item display area A4 includes a GUI icon IC3 (a YES button) for permitting details displayed in the text information display area A3, and a GUI icon IC4 (a NO button) for rejecting the displayed details. The input 320 or the display 330 serving as a touch panel transmits accepted information to the vehicle M via the communicator 310 when the operation of the user U on the GUI icon IC3 or IC4 has been accepted. When an instruction for executing automated entering (an example of a departure instruction for causing the vehicle M to depart) has been accepted on the basis of instruction information transmitted from the terminal device 300, the autonomous parking controller 142 of the vehicle M generates an action plan for causing the vehicle M to depart so that the vehicle M is parked in a predetermined parking space according to an automated parking event. When the instruction for rejecting the execution of the automated entering has been accepted, the autonomous parking controller 142 maintains the stop in the free stopping area 410F as shown in FIG. 6. Thereby, for example, because the vehicle can be temporarily stopped when there is business to be done in a short time, it is possible to get into the vehicle immediately without waiting for the vehicle to enter or leave the parking space PS.

Because a temporarily stopped vehicle and a vehicle whose automated entering is performed immediately after a getting-out process are mixed in the free getting-into/out area 420F, the autonomous parking controller 142 can prevent the automated entering process from being executed against the intention of the user U by sending an inquiry to the user U when the door lock operation has been accepted in a state in which the vehicle has been stopped in the free stopping area 410F.

When the reservation of the parking area is completed while the vehicle M is stopped in the free stopping area 410F, the autonomous parking controller 142 may cause the vehicle M to depart according to the automated parking event in the step in which the door lock operation has been accepted without asking for an instruction of the user U by displaying the image shown in FIG. 8 on the terminal device 300. Thereby, when the vehicle M is stopped in the free stopping area 410F, it is also possible to execute the automated parking event immediately without performing the automated entering confirmation of the user U.

Fourth Control Pattern

Next, a fourth control pattern will be described. In the fourth control pattern, the autonomous parking controller 142 may determine whether or not an occupant including the user U is present in the interior of the vehicle and cause the vehicle to depart by causing the automated parking event to be executed if it is recognized that the door of the vehicle M is locked when the occupant is absent. Thereby, it is possible to prevent the occupant from being left in the interior of the vehicle against the intention of the occupant.

Fifth Control Pattern

Next, a fifth control pattern will be described. The fifth control pattern is a pattern for providing a notification to the terminal device 300 when it is recognized that the user U who has gotten out of the vehicle M is a predetermined distance or more away from the vehicle M in a state in which a predetermined condition for causing the vehicle M to depart according to the automated parking event is not satisfied. For example, conditions for causing the vehicle M to depart include a condition that the user U has gotten out of the vehicle in the getting-into/out area 420 (hereinafter referred to as a first condition), a condition that the door of the vehicle M is locked (hereinafter referred to as a second condition), a condition that no occupant is present in the interior of the vehicle (hereinafter referred to as a third condition), and the like. The above-described conditions are merely examples and other conditions may be added thereto or the above-described conditions may be replaced with other conditions.

The autonomous parking controller 142 assumes the position of the terminal device 300 possessed by the user U as the position information of the user U, calculates a distance between the vehicle M and the user U from the position information of the vehicle M and the position information of the terminal device 300, and causes a notification to be provided to the terminal device 300 through the HMI controller 180 when the calculated distance is greater than or equal to the predetermined distance and when the above-described first to third conditions are not satisfied. In this case, the HMI controller 180 may provide a notification of information about a condition that is not satisfied among the above-described first to third conditions.

Figure 9:
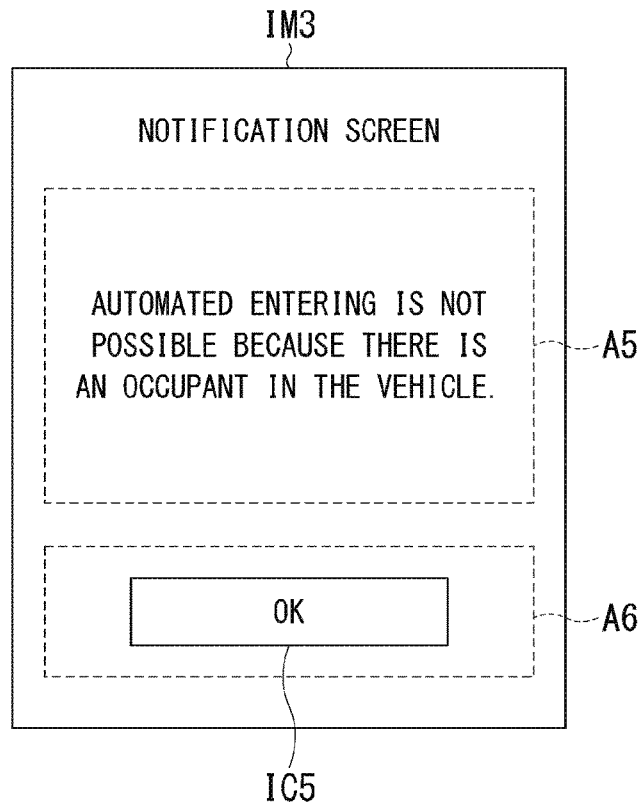
FIG. 9 is a diagram showing an example of an image related to a notification indicating that an automated parking event cannot be executed.

FIG. 9 is a diagram showing an example of an image related to a notification indicating that an automated parking event cannot be executed. An image IM3 shown in FIG. 9 is an image generated by the output controller 360 of the terminal device 300 according to an instruction of the HMI controller 180 and displayed on the display 330. In the example of FIG. 9, the image IM3 includes a text information display area A5 and a selection item display area A6 as a notification screen. In the text information display area A5, for example, text information indicating that the automated parking event cannot be executed is displayed. In the example of FIG. 9, text information indicating that "Automated entering is not possible because there is an occupant in the vehicle" is displayed in the text information display area A5 to notify that the above-described third condition is not satisfied.

The selection item display area A6 includes a GUI icon IC5 (an OK button) for permitting details displayed in the text information display area A5. The output controller 360 causes the display of the image IM3 to be terminated when the operation of the user U on the GUI icon IC5 has been accepted by the input 320 or the display 330 serving as a touch panel. Thereby, the user U can be allowed to more clearly understand why the automated parking event is not started. The user U may cause the automated parking event to be executed by visually recognizing the above-described image IM3, performing adjustment so that all conditions for executing the automated parking event are satisfied (allowing all occupants in the interior of the vehicle to get out of the vehicle in the example of FIG. 9), and performing the door locking operation again.

When all the above-described conditions for causing the vehicle M to depart are not satisfied, the HMI controller 180 may cause the image IM2 corresponding to the above-described automated entering confirmation screen shown in FIG. 8 to be displayed on the terminal device 300 instead of causing the terminal device 300 to display the image IM3 corresponding to the notification screen shown in FIG. 9. Thereby, for example, it is possible to cause the automated parking event to be executed according to an operation simpler than a normal operation on the basis of details of a condition that is not satisfied among predetermined conditions even though all conditions for causing the vehicle M to depart are not satisfied so that the vehicle M is parked according to the automated parking event. The simple operation includes, for example, an operation in which the number of item selection operations is less than usual or an operation in which a part of the operation is omitted. Therefore, when the occupant is allowed to be intentionally present in the interior of the vehicle (for example, when the occupant is allowed to stay therein), it is possible to cause automated entering to be executed according to a simple operation using the image IM2 shown in FIG. 8 without involving the display of the notification screen shown in FIG. 9.

For example, the autonomous parking controller 142 may predetermine priority for each predetermined condition for causing the vehicle M to depart, cause the terminal device 300 to display the image IM3 shown in FIG. 9 when priority of a condition that is not satisfied is high, and cause the terminal device 300 to display the image IM2 (a simple operation image) shown in FIG. 8 when priority is low. For example, the priority may be set according to each destination facility to be visited, each shape of the getting-into/out area and the stopping area, a degree of congestion of the getting-into/out area, a time period, and the like. The autonomous parking controller 142 may cause the terminal device 300 to display the image IM3 shown in FIG. 9 when the number of conditions that are not satisfied among a plurality of predetermined conditions is greater than or equal to a predetermined number and cause the terminal device 300 to display the image IM2 shown in FIG. 8 when the number of conditions that are not satisfied is less than the predetermined number. Thereby, a more appropriate notification can be given to the user U on the basis of priorities and the number of conditions that are not satisfied.

Sixth Control Pattern

Next, a sixth control pattern will be described. The sixth control pattern is a pattern for causing the vehicle M to depart while executing the automated parking event when the terminal device 300 is not present in the interior of the vehicle and when it is recognized that the door of the vehicle M is locked. Specifically, the terminal recognizer 135 analyzes an image captured by the vehicle interior camera 90 to acquire feature information of a physical object, performs pattern matching between the acquired feature information and predetermined feature information of the terminal device 300, and determines whether or not the terminal device 300 is included in an image captured by the vehicle interior camera 90. When the autonomous parking controller 142 executes the automated parking event and generates an action plan for causing the vehicle M to depart if other conditions (for example, the first to third conditions) for causing the vehicle M to depart are satisfied when it is recognized that the terminal device 300 is absent in the interior of the vehicle from a recognition result of the terminal recognizer 135. For example, the autonomous parking controller 142 does not execute the automated parking event (maintains the stopping of the vehicle) even though other conditions (for example, the first to third conditions) for causing the vehicle M to depart are satisfied in advance when it is recognized that the terminal device 300 is present in the interior of the vehicle from a recognition result of the terminal recognizer 135. Thereby, it is possible to minimize a situation in which an instruction is not issued from the terminal device 300 at the time of leaving because no automated entering is performed even though the door lock operation is accepted when the terminal device 300 for making the leaving instruction is present in the interior of the vehicle. When the door lock operation has been performed in a state where the terminal device 300 is present in the interior of the vehicle, the HMI controller 180 operates a buzzer or an emergency flashing indicator light provided in the vehicle M, so that a notification indicating that the terminal device 300 is present in the interior of the vehicle may be provided to the user U. Thereby, it is possible to allow the user U to easily ascertain that the terminal device 300 has been left in the interior of the vehicle.

For example, each of the above-described first to sixth control patterns may be combined with some or all of other control patterns. Which one of the first to sixth control patterns is to be used may be set by the user U or may be determined by a form of the parking lot PA or the getting-into/out area 420 and a control mode of the vehicle M.

Process Flow

Figure 10:
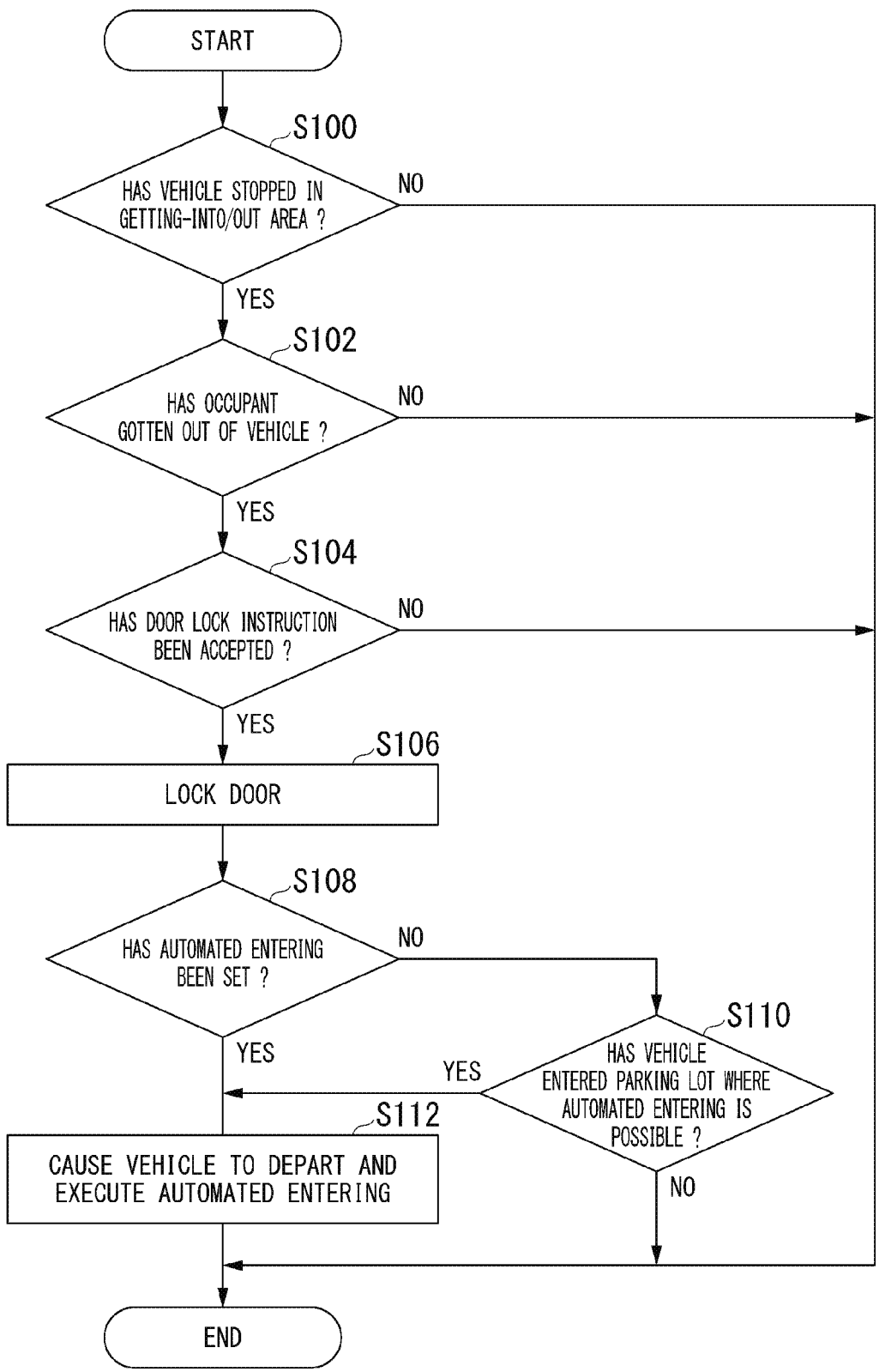
FIG. 10 is a flowchart showing an example of a flow of a process to be executed by an automated driving control device of the embodiment.

FIG. 10 is a flowchart showing an example of a flow of a process to be executed by the automated driving controller 100 according to the embodiment. In the following, the entering process in the autonomous parking event described above will be mainly described. First, the recognizer 130 determines whether or not the vehicle M has stopped in the getting-into/out area on the basis of position information of the vehicle M and map information of the destination facility to be visited (step S100). When it is determined that the vehicle M has stopped in the getting-into/out area, the occupant recognizer 134 determines whether or not the occupant (the user U) has gotten out of the vehicle (step S102). When it is determined that the occupant has gotten out of the vehicle, the door lock recognizer 132 determines whether or not an instruction for locking the door of the vehicle M has been accepted (step S104). When it is determined that the instruction for locking the door of the vehicle M has been accepted, the door lock device 42 locks the door (step S106). Next, the parking setting recognizer 133 determines whether or not automated entering has been set after the locking of the door (step S108).

When it is determined that the automated entering has not been set, the autonomous parking controller 142 determines whether or not the vehicle M has entered a parking lot where the automated entering is possible (step S110). When it is determined that the automated entering has been set in the processing of step S108 or when it is determined that the vehicle M has entered a parking lot where the automated entering is possible in the processing of step S110, the autonomous parking controller 142 causes the vehicle M to depart and causes the automated entering to be executed (step S112). Thereby, the process of the present flowchart ends. When it is determined that the vehicle M has not stopped in the getting-into/out area in the processing of step S100, when it is determined that the occupant has not gotten out of the vehicle M in the processing of step S102, when it is determined that no door lock instruction has been accepted in the processing of step S104, or when it is determined that the vehicle M has not entered the parking lot where automated entering is possible in the processing of step S110, the automated entering is not executed and the process of the present flowchart ends. When no automated entering is performed, an image corresponding to a notification screen indicating the reason why no automated entering is performed may be generated and the generated image may be displayed on the terminal device 300.

Figure 11:
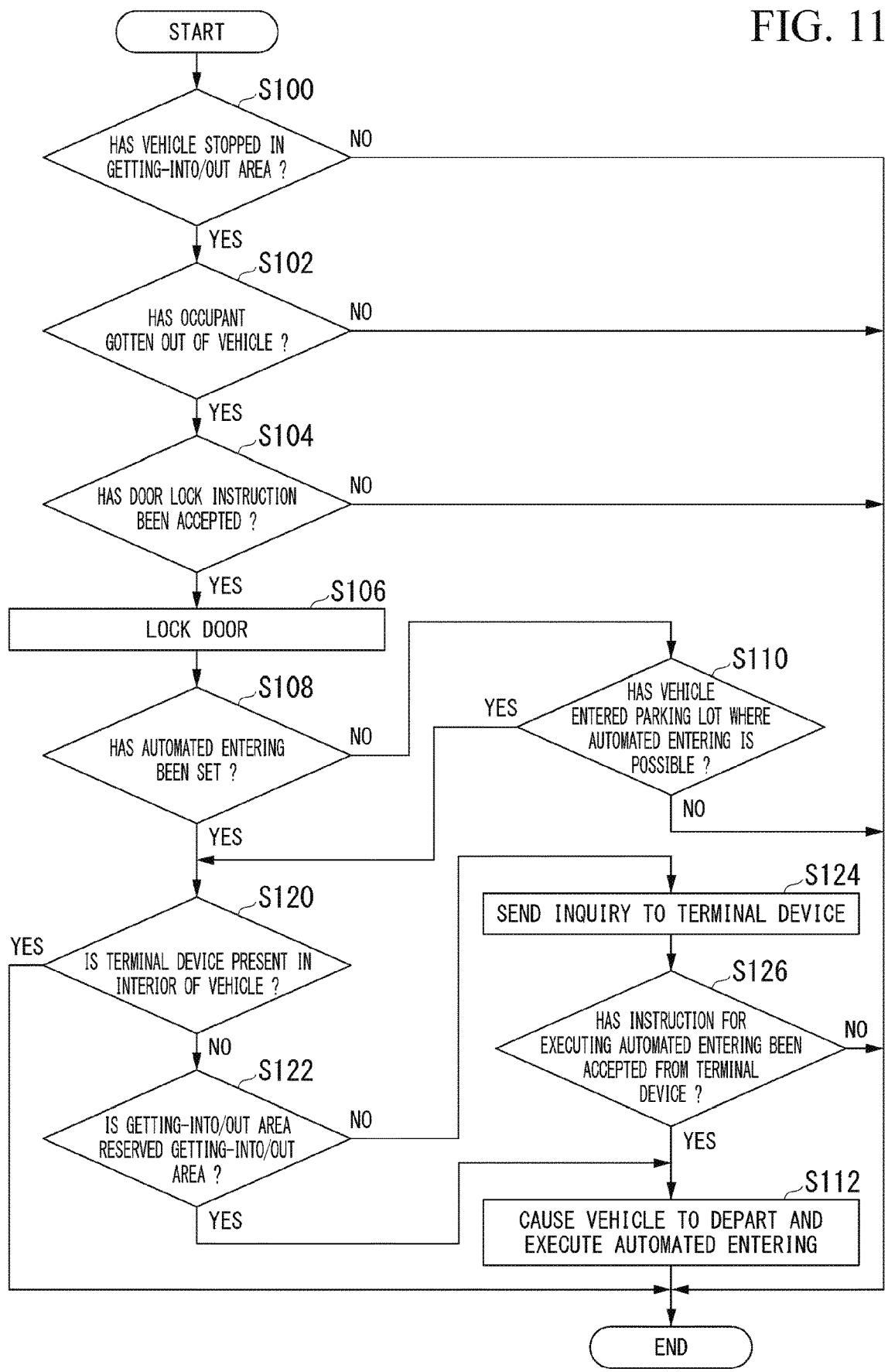
FIG. 11 is a flowchart showing another example of the flow of the process to be executed by the automated driving control device of the embodiment.

In the embodiment, in addition to the automated entering process shown in FIG. 10, for example, the automated entering process may be executed by combining results of determining whether or not the getting-into/out area is a reserved getting-into/out area or whether or not the terminal device has been left. FIG. 11 is a flowchart showing another example of a flow of a process to be executed by the automated driving controller 100 according to the embodiment. The process of FIG. 11 is different from the above-described process shown in FIG. 10 in that the processing of steps S120 to S126 is added. Therefore, in the following, the description of the processing of steps S120 to S126 will be mainly described and other description will be omitted. In the example of FIG. 11, it is assumed that the getting-into/out area 420 includes a reserved getting-into/out area 420R and a free getting-into/out area 420F.

When it is determined that the automated entering has been set in the processing of step S108 shown in FIG. 11 or when it is determined that the vehicle M has entered the parking lot where the automated entering is possible in the processing of step S110, the autonomous parking controller 142 determines whether or not the terminal device 300 is present in the interior of the vehicle M according to a recognition result of the terminal recognizer 135 (step S120). When it is determined that the terminal device 300 is not present in the interior of the vehicle, the autonomous parking controller 142 determines whether or not the getting-into/out area 420 is the reserved getting-into/out area 420R (step S122). When it is determined that the getting-into/out area 420 is not the reserved getting-into/out area 420R, the HMI controller 180 sends an inquiry about whether or not the automated parking event is to be executed to the terminal device 300 (step S124). Next, the HMI controller 180 determines whether or not an instruction for executing the automated entering has been accepted from the terminal device 300 (step S126).

When it is determined that the getting-into/out area is a reserved getting-into/out area in the processing of step S122 or when it is determined that an instruction for executing automated entering has been accepted from the terminal device 300 in the processing of step S126, the autonomous parking controller 142 causes the vehicle M to depart and causes the automated entering to be executed (step S112). Thereby, the process of the present flowchart ends. Also, when it is determined that the terminal device 300 is present in the interior of the vehicle in the processing of step S120 or when it is determined that the instruction for executing the automated entering has not been accepted from the terminal device 300 in the processing of step S126, the automated entering is not executed and the process of the present flowchart ends. When it is determined that the terminal device 300 is present in the interior of the vehicle in the processing of step S120, a buzzer or an emergency flashing indicator light provided on the vehicle M may be operated to provide a notification to the occupant.

According to the above-described embodiment, for example, the automated driving controller 100 includes the recognizer 130 configured to recognize a surrounding environment of the vehicle M and recognize a locking state of the vehicle M; and a driving controller (the action plan generator 140 and the second controller 160) configured to perform driving control of one or both of a speed and steering of the vehicle M on the basis of a recognition result of the recognizer 130, wherein the driving controller causes the vehicle M to depart when a door of the vehicle M is locked after an occupant of the vehicle M gets out of the vehicle M in a predetermined area in a state in which predetermined conditions are satisfied, so that it is possible to execute more appropriate driving control. Specifically, according to the above-described embodiment, the automated driving controller 100 can minimize the execution of the automated parking against the user's intention and cause self-traveling traveling (parking based on automated driving) to be reliably executed according to a simple operation.

Although the driving controller performs control for causing the vehicle M to depart when the door of the vehicle M is locked after the occupant of the vehicle M gets out of the vehicle M in a predetermined area in a state in which predetermined conditions are satisfied in the above-described embodiment, the driving control is executed so that the vehicle M is not in contact with the occupant who has gotten out of the vehicle M. For example, the driving controller executes control for causing the vehicle to travel when an occupant who has gotten out of the vehicle M is a predetermined distance or more away from the vehicle M or when a predetermined time period has elapsed from the locking of the door.

Hardware Configuration

Figure 12:
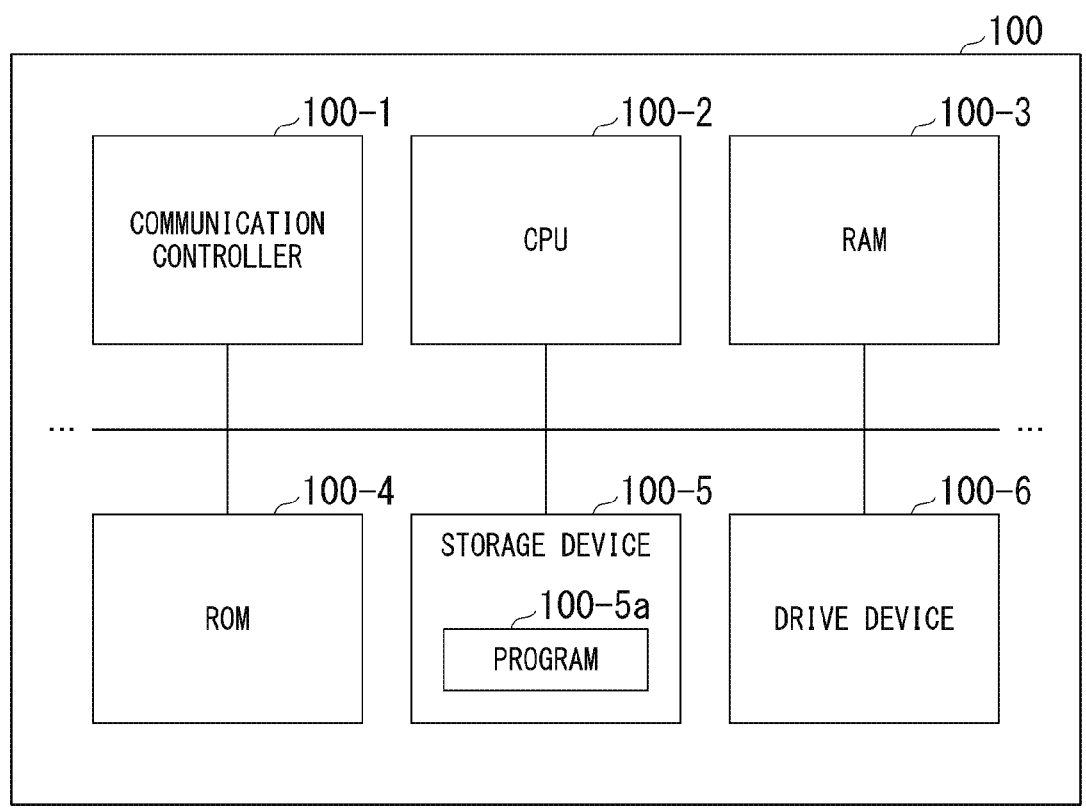
FIG. 12 is a diagram showing an example of a hardware configuration of the automated driving control device according to the embodiment.

FIG. 12 is a diagram showing an example of a hardware configuration of the automated driving controller 100 of the embodiment. As shown in FIG. 12, a computer of the automated driving controller 100 has a configuration in which a communication controller 100-1, a CPU 100-2, a RAM 100-3 used as a working memory, a ROM 100-4 storing a boot program and the like, a storage device 100-5 such as a flash memory or a HDD, a drive device 100-6, and the like are mutually connected by an internal bus or a dedicated communication line. The communication controller 100-1 communicates with components other than the automated driving controller 100. A portable storage medium such as an optical disk (for example, a computer-readable non-transitory storage medium) is mounted on the drive device 100-6. The storage device 100-5 stores a program 100-5a to be executed by the CPU 100-2. This program is loaded to the RAM 100-3 by a direct memory access (DMA) controller (not shown) or the like and executed by the CPU 100-2. The program 100-5a referred to by the CPU 100-2 may be stored in a portable storage medium mounted on the drive device 100-6 or may be downloaded from another device via a network. Thereby, some or all of the components of the automated driving controller 100 are implemented.

The embodiment described above can be represented as follows.

A vehicle control device including:

a storage device storing a program; and a hardware processor, wherein the hardware processor executes the program stored in the storage device to:

recognize a surrounding environment of a vehicle and recognize a locking state of the vehicle;

perform driving control of one or both of a speed and steering of the vehicle on the basis of a recognition result; and cause the vehicle to depart when a door of the vehicle is locked after an occupant of the vehicle gets out of the vehicle in a predetermined area in a state in which predetermined conditions are satisfied.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer configured to recognize a surrounding environment of a vehicle and recognize a locking state of the vehicle; and
a driving controller configured to perform driving control of one or both of a speed and steering of the vehicle on the basis of a recognition result of the recognizer,
wherein the driving controller causes the vehicle to depart when a door of the vehicle is locked after an occupant of the vehicle gets out of the vehicle in a predetermined area including a first area and a second area, in a state in which predetermined conditions are satisfied,
wherein the first area is where the occupant of the vehicle gets into or out of the vehicle whose reservation is completed for causing the vehicle to be parked in the predetermined parking area and the second area is where the occupant of the vehicle that completed the reservation and occupants of vehicles without completed reservations can get into or out of the vehicle,
wherein, in a case that the occupant gets out of the vehicle in the first area, the driving controller causes the vehicle to depart when after the vehicle that has completed the reservation has gotten out the occupants in the first area and the doors of the vehicle is locked,
in a case that the occupant gets out of the vehicle in the second area, the driving controller causes the vehicle to depart when after the vehicle that has or has not completed the reservation has gotten out the occupants in the second area, the doors of the vehicle is locked and received departure instructions from the occupant.

2. The vehicle control device according to claim 1, further comprising an acceptor configured to accept an operation of the occupant,
wherein the driving controller causes the vehicle to be parked in a parking area when the acceptor accepts a setting of a mode in which the vehicle is parked in a predetermined parking area before the occupant gets out of the vehicle, the occupant of the vehicle gets out of the vehicle in the predetermined area, and the door of the vehicle is locked.

3. The vehicle control device according to claim 2, wherein the driving controller does not execute driving control for causing the vehicle to be parked in the parking area when the conditions (a) to (c) below are satisfied;
(a) the driving controller does not acquire the setting information of the mode before the occupant gets out of the vehicle,
(b) the occupant of the vehicle gets out of the vehicle in the predetermined area, and
(c) the door of the vehicle is locked after the occupant gets out of the vehicle.

4. The vehicle control device according to claim 1, wherein the driving controller causes the vehicle to depart when the recognizer recognizes that the vehicle has entered an area where the vehicle is allowed to travel according to the driving control and when the occupant of the vehicle gets out of the vehicle in the predetermined area and the door of the vehicle is locked.

5. The vehicle control device according to claim 1,
wherein the driving controller causes the vehicle to depart when the following conditions (d) through (f) are satisfied in that order;
(d) the vehicle whose reservation is not completed is stopped at a position where the occupant is allowed to get out of the vehicle in the second area,
(e) the reservation is completed,
(f) the door of the vehicle is locked.

6. The vehicle control device according to claim 1, further comprising:
- a communicator configured to communicate with a terminal device of the occupant; and
- a notification controller configured to provide a notification to the terminal device,
- wherein the notification controller provides the notification to the terminal device via the communicator when, in a state in which the predetermined conditions are not satisfied, the occupant gets out of the vehicle and is more than a predetermined distance away from the vehicle.

7. The vehicle control device according to claim 6, wherein the notification controller accepts a simple operation from the terminal device and causes the driving controller to cause the vehicle to depart on the basis of details of a condition that is not satisfied among the predetermined conditions.

8. The vehicle control device according to claim 1, wherein the driving controller causes the vehicle to depart when the recognizer recognizes that there is no occupant in an interior of the vehicle and that the door of the vehicle is locked.

9. The vehicle control device according to claim 1, wherein the driving controller causes the vehicle to depart when the recognizer recognizes that there is no terminal device of the occupant who has gotten out of the vehicle in an interior of the vehicle and that the door of the vehicle is locked.

10. The vehicle control device according to claim 9, wherein the driving controller does not cause the vehicle to depart even though the recognizer recognizes that the door of the vehicle is locked when there is a terminal device of the occupant who has gotten out of the vehicle in the interior of the vehicle.

11. A vehicle control method comprising:
- recognizing, by a computer, a surrounding environment of a vehicle and recognizing a locking state of the vehicle;
- performing, by the computer, driving control of one or both of a speed and steering of the vehicle on the basis of a recognition result; and
- causing, by the computer, the vehicle to depart when a door of the vehicle is locked after an occupant of the vehicle gets out of the vehicle in a predetermined area including a first area and a second area, in a state in which predetermined conditions are satisfied,
- wherein the first area is where the occupant of the vehicle gets into or out of the vehicle whose reservation is completed for causing the vehicle to be parked in the predetermined parking area and the second area is where the occupant of the vehicle that completed the reservation and occupants of vehicles without completed reservations can get into or out of the vehicle, and
- wherein, in a case that the occupant gets out of the vehicle in the first area, causing, by the computer, the vehicle to depart when after the vehicle that has completed the reservation has gotten out the occupants in the first area and the doors of the vehicle is locked,
- in a case that the occupant gets out of the vehicle in the second area, causing, by the computer, the vehicle to depart when after the vehicle that has or has not completed the reservation has gotten out the occupants in the second area, the doors of the vehicle is locked and received departure instructions from the occupant.

12. A computer-readable non-transitory storage medium storing a program for causing a computer to:
- recognize a surrounding environment of a vehicle and recognize a locking state of the vehicle;
- perform driving control of one or both of a speed and steering of the vehicle on the basis of a recognition result; and
- cause the vehicle to depart when a door of the vehicle is locked after an occupant of the vehicle gets out of the vehicle in a predetermined area including a first area and a second area, in a state in which predetermined conditions are satisfied,
- wherein the first area is where the occupant of the vehicle gets into or out of the vehicle whose reservation is completed for causing the vehicle to be parked in the predetermined parking area and the second area is where the occupant of the vehicle that completed the reservation and occupants of vehicles without completed reservations can get into or out of the vehicle, and
- wherein, in a case that the occupant gets out of the vehicle in the first area, cause the vehicle to depart when after the vehicle that has completed the reservation has gotten out the occupants in the first area and the doors of the vehicle is locked,
- in a case that the occupant gets out of the vehicle in the second area, cause the vehicle to depart when after the vehicle that has or has not completed the reservation has gotten out the occupants in the second area, the doors of the vehicle is locked and received departure instructions from the occupant.

* * * * *